United States Patent [19]

Nakano et al.

[11] Patent Number: 4,794,268

[45] Date of Patent: Dec. 27, 1988

[54] AUTOMOTIVE KEYLESS ENTRY SYSTEM INCORPORATING PORTABLE RADIO SELF-IDENTIFYING CODE SIGNAL TRANSMITTER

[75] Inventors: Kinichiro Nakano; Mikio Takeuchi, both of Kanagawa, Japan

[73] Assignee: Nissan Motor Company, Limited, Yokohama, Japan

[21] Appl. No.: 64,006

[22] Filed: Jun. 19, 1987

[30] Foreign Application Priority Data

Jun. 20, 1986 [JP] Japan ................................ 61-144212

[51] Int. Cl.$^4$ ........................ B62D 45/00; G06F 7/04; G08C 19/00; B60R 25/04

[52] U.S. Cl. .............................. 307/10 AT; 307/10 R; 340/825.31; 340/825.69; 340/52 D; 70/257

[58] Field of Search ........................ 307/10 AT, 10 R; 340/825.31, 825.69, 52 D, 63; 180/287; 70/257

[56] References Cited

U.S. PATENT DOCUMENTS 3,587,051 6/1971 Hovey ................................ 340/164
3,593,816 7/1971 Kazaoka ............................. 180/113
3,633,167 1/1972 Hedin ................................ 340/164
3,641,396 2/1972 Kossen eet al. ..................... 317/134
3,656,098 4/1972 Duren et al. ........................ 340/52
3,670,275 6/1972 Kalliomaki et al. ................ 325/370
3,697,943 10/1972 Andres ............................ 340/52
3,710,316 1/1973 Kromer .............................. 340/63
3,723,967 3/1973 Atkins et al. ....................... 340/63
3,751,718 8/1973 Hanchett, Jr. ...................... 317/134
3,754,164 8/1973 Zorzy ................................ 317/134
3,754,213 8/1973 Morroni et al. ..................... 340/147
3,764,859 10/1973 Wood et al. ...................... 317/134
3,781,854 12/1973 Kaufman et al. .................. 340/64
3,812,403 5/1974 Gartner .............................. 317/134
3,830,332 8/1974 Fontaine ............................ 180/113
3,831,065 8/1974 Martin et al. ....................... 317/134
3,859,624 1/1975 Kriofsky et al. .................... 340/38
3,866,168 2/1975 McGuirk, Jr. ....................... 340/64
3,871,474 3/1975 Tomlinson et al. ................. 180/112
3,878,511 4/1975 Wagner .............................. 340/147
3,885,408 5/1975 Clark, Jr. ............................ 70/278
3,891,980 6/1975 Lewis et al. ........................ 340/258
3,953,769 4/1976 Sopko ................................ 317/134
4,004,273 1/1977 Kalogerson .......................... 340/64
4,100,534 7/1978 Shifflet, Jr. ......................... 340/149
4,114,147 9/1978 Hile .................................... 340/528
4,129,855 12/1978 Rodrian ............................. 340/152
4,137,985 2/1979 Winchell ............................ 180/114
4,142,097 2/1979 Ulch ................................... 235/382
4,143,368 3/1979 Route et al. ........................ 340/543
4,148,092 4/1979 Martin ............................... 361/172
4,160,240 7/1979 Partipilo ............................ 340/311
4,189,712 2/1980 Lemelson ........................... 340/149
4,196,347 4/1980 Hadley ............................... 455/603
4,205,300 5/1980 Ho et al. ............................. 340/65
4,205,325 5/1980 Haygood et al. ................... 340/147
4,206,491 6/1980 Ligman et al. ..................... 361/172
4,222,088 9/1980 Burton ............................... 361/172
4,223,296 9/1980 Kim et al. ........................... 340/52
4,232,354 11/1980 Mueller et al. ................... 361/172

(List continued on next page.)

FOREIGN PATENT DOCUMENTS 0138090 9/1984 European Pat. Off. .
0140137 5/1985 European Pat. Off. .
0154306 9/1985 European Pat. Off. .

*Primary Examiner*—William M. Shoop, Jr.
*Assistant Examiner*—Sharon D. Logan
*Attorney, Agent, or Firm*—Foley & Lardner, Schwartz, Jeffery, Schwaab, Mack, Blumenthal & Evans

[57] ABSTRACT

A keyless entry system has a controller mounted on the vehicle which generates a radio signal for triggering a portable radio signal transmitter. The transmitter triggering radio signal of the controller contains a preset triggering code. The portable transmitter receives the transmitter triggering radio signal from the controller to compare the triggering code with a preset code to generate a transmitter identifying code containing radio signal when the triggering code matches the preset code in the portable transmitter. The controller receives the transmitter identifying code containing radio signal to compare the received code with a preset code to output a control signal for operating a preselected vehicle device when the received code matches the preset code in the controller.

8 Claims, 4 Drawing Sheets

U.S. PATENT DOCUMENTS

| | | | |
|---|---|---|---|
| 4,233,642 | 11/1980 | Ellsberg | 361/172 |
| 4,240,516 | 12/1980 | Henderson et al. | 180/289 |
| 4,249,161 | 2/1981 | Mohnhaupt | 340/52 |
| 4,249,245 | 2/1981 | Nakanishi et al. | 364/710 |
| 4,291,237 | 9/1981 | Kitano | 307/10 |
| 4,309,674 | 1/1982 | Owen | 332/18 |
| 4,317,157 | 2/1982 | Eckloff | 361/172 |
| 4,327,255 | 4/1982 | Suszylo | 179/90 |
| 4,332,305 | 6/1982 | Kocolowski | 180/271 |
| 4,354,189 | 10/1982 | Lemelson | 340/825.31 |
| 4,388,524 | 6/1983 | Walton | 235/380 |
| 4,418,416 | 11/1983 | Lese et al. | 375/5 |
| 4,447,808 | 5/1984 | Marcus | 340/696 |
| 4,450,431 | 5/1984 | Hochstein | 340/58 |
| 4,471,343 | 9/1984 | Lemelson | 307/10 AT X |
| 4,473,825 | 9/1984 | Walton | 340/825.54 |
| 4,477,806 | 10/1984 | Mochida et al. | 340/825.32 |
| 4,479,255 | 10/1984 | Geesen et al. | 455/246 |
| 4,486,806 | 12/1984 | Mochida et al. | 361/172 |
| 4,509,093 | 4/1985 | Stellberger | 361/172 |
| 4,511,946 | 4/1985 | McGahan | 361/172 |
| 4,535,333 | 8/1985 | Twardowski | 340/825.69 |
| 4,550,444 | 10/1985 | Uebel | 455/41 |
| 4,554,542 | 11/1985 | Dolikian | 340/825.76 |
| 4,595,902 | 6/1986 | Proske et al. | 340/63 |
| 4,598,275 | 7/1986 | Ross et al. | 340/573 |
| 4,619,002 | 10/1986 | Thro | 455/226 |
| 4,630,044 | 12/1986 | Polzer | 340/825.72 |
| 4,670,746 | 6/1987 | Taniguchi et al. | 340/425.31 |
| 4,672,375 | 6/1987 | Mochida | 340/825.31 |
| 4,688,036 | 8/1987 | Hirano et al. | 340/825.69 |
| 4,703,714 | 11/1987 | Bajka et al. | 118/57 |
| 4,719,460 | 1/1988 | Takeuchi et al. | 340/825.31 |

AUTOMOTIVE KEYLESS ENTRY SYSTEM INCORPORATING PORTABLE RADIO SELF-IDENTIFYING CODE SIGNAL TRANSMITTER

BACKGROUND OF THE INVENTION

1. Field of the Invention

The present invention relates generally to a door locking and unlocking system for an automotive vehicle, which includes a radio signal transmitter generating a self-identifying radio code signal for operating the door lock. More specifically, the invention relates to a door locking and unlocking system which improves system response with wider variations of radio transmitter identifying codes.

2. Description of the Prior Art

Automotive keyless entry systems have been disclosed in the European Patent First Publication Nos. 01 38 090, 01 40 137 and 01 54 306, for example. Generally such keyless entry system comprises a controller mounted on a vehicle and a pocket portable radio signal transmitter. The controller is actuated in response to a push button to output a radio signal for triggering the transmitter. The transmitter is responsive to the radio signal from the controller to transmit a radio signal containing a preset unique code. The controller receive the radio signal from the transmitter to same with a preset code therein. The controller outputs a control signal for operating a vehicle devices, such as an automatic door lock, when the received code matches the preset code.

For the purpose of theft prevention, the unique codes set in radio signal transmitters have to be differentiated from those of other transmitters. As may be appreciated, the number of variations of the unique code is determined according to the number of digits or bits to be used for constituting the unique code. However, increasing of the number of digits or bits requires greater consumption of the electricity. Therefore, in considering the life of a battery used in the radio signal transmitter, it is desirable to limit the number of digits or bits for the unique code.

On the other hand, in case that the keyless entry system is triggered with a single trigger code for triggering the portable transmitters, a plurality of transmitters tend to respond to the trigger signal at the same timing to cause interference of respectively transmitted transmitter identifying codes containing radio signals to thereby cause malfunction in the control unit. From this point of view, it would be better to selectively trigger the portable transmitters so that the generated transmitter identifying codes containing radio signals will not interfer with each other.

SUMMARY OF THE INVENTION

Therefore, it is an object of the invention to provide a keyless entry system which can successfully avoid the interference between a plurality of transmitter identifying codes containing radio signals to be transmitted to different transmitters.

Another object of the invention is to provide a keyless entry system which can quickly respond to manual operation.

In order to accomplish the aforementioned and other objects, a keyless entry system according to the present invention, has a controller mounted on the vehicle which generates a radio signal for triggering a portable radio signal transmitter. The transmitter triggering radio signals of the controller contains a preset triggering code. The transmitter receives the controller triggering radio signal from the transmitter to compare the triggering code with a preset code to generate a transmitter identifying code containing radio signals when the triggering code matches the preset code in the transmitter. The controller receives the transmitter identifying code containing radio signal to compare the received code with a preset code to output a control signal for operating a preselected vehicle device when the received code matches the preset code in the controller.

So that the controller may be used commonly, the controller is set to output the different controller identifying code containing radio signals in order. The controller detects reception of the transmitter identification code containing radio signal to record the controller identification code to which the transmitter responded to set the corresponding code as the first code to be transmitted with the radio signal.

According to one aspect of the invention, a keyless entry entry system for an automotive vehicle comprises a vehicle device including an actuator operating the vehicle device between a predetermined first position and a predetermined second position, a manually operable switch for triggering keyless entry operation, first means mounted on a vehicle body and responsive to manual operation of the manually operable switch, for transmitting a first radio signal containing a trigger code, the first means being set with a plurality of mutually distinct trigger codes and selecting one of the trigger codes in a given order, second means, which is separated from the vehicle body and is portable, for receiving the trigger code in the first radio signal to compare with a first preset code, and generating a second radio signal containing a preset transmitter identifying code, and third means, mounted on a vehicle body and adapted to receive the second radio signal, for comparing the transmitter identifying code with a second preset code for producing a control signal to operate the actuator in the vehicle device to a desired one of the first and second positions when the transmitter identifying code matches the second preset code, the third means setting one of the triggering code in the first code to be the first code to be transmitted in response to the next occurence of manual operation of the manually operable switch.

In the preferred construction, the first and third means are combined into a single unit to be mounted on the vehicle.

On the other hand, the second means comprises a portable transmitter of a size comparable with a credit card or bank card. The keyless entry system set forth above may applicable for keyless operation of a vehicular door lock device. Therefore, the vehicle device may be a door lock operable between the first position which is a door locking position and the second position which is a door unlocking position.

On the other hand, the third means triggers the first means with a given interval to make the latter operative to change the selected trigger code in the given order until the transmitter identifying code matching the second preset code is received.

It would be more advantageous to provide a timer means, in the keyless entry system set forth above for measuring an elapsed time from manual operation of the push button to stop operation of transmission of the first code signal when the measured time reaches a given period of time.

DESCRIPTION OF THE PREFERRED EMBODIMENT

Figure 1:
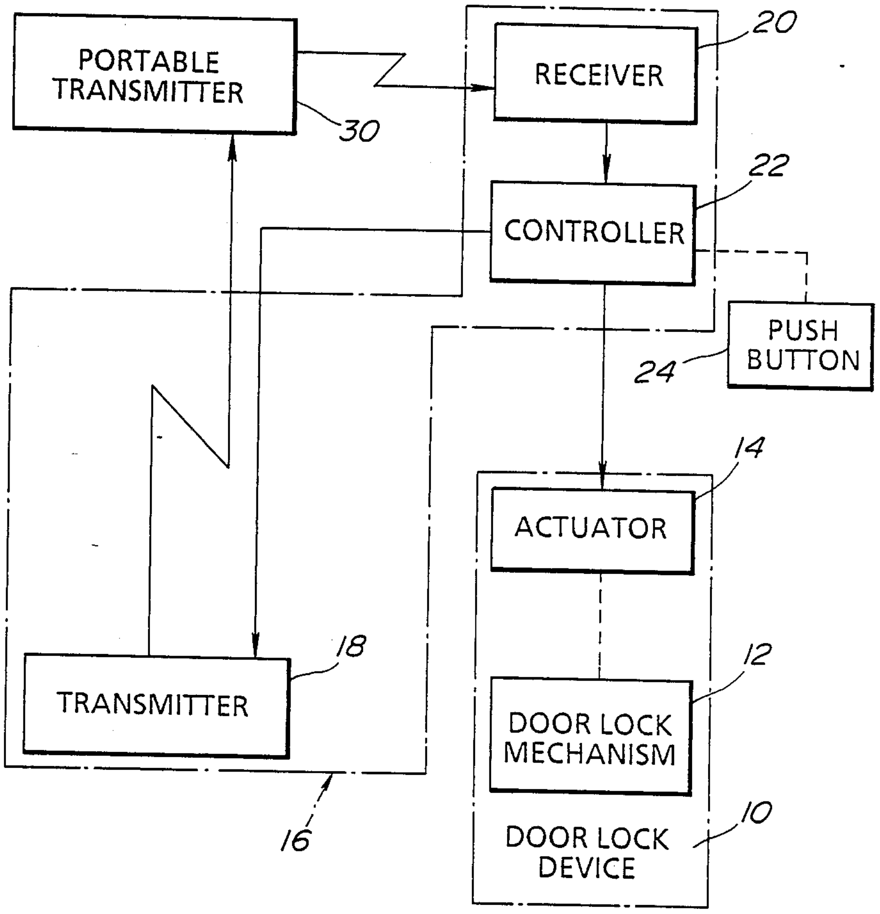
FIG. 1 is a schematic block diagram of the preferred embodiment of an automotive door locking and unlocking system including a keyless entry system according to the present invention.

Referring now to the drawings, particularly to FIG. 1, the general construction of the preferred embodiment of a keyless entry system, according to the invention is illustrated as applied for an automotive door locking and unlocking system. The automotive door locking and unlocking system includes a door lock device 10 which is operable between a door locking position and unlocking position. The door locking device 10 includes a door lock mechanism 12 and an electrically operable actuator 14 which operates the door lock mechanism. The actuator 14 is connected a control unit 16 to receive a control signal therefrom. The control unit 16 includes a transmitter stage 18, a receiver stage 20 and a controller stage 22.

The transmitter stage 18 in the controller unit 16 is set with a plurality of distinct codes and intermittently generates radio signals, each of which contains one of the preset code, in order. The transmitter stage 18 is triggered by means of a manually operable push button 24 mounted on the external surface of a vehicle body. Preferably, the push button 24 is located adjacent a vehicular door to be locked and unlocked. The transmitter stage 18 is triggered by depression of the push button 24 to transmit the preset code containing radio signals intermittently at predetermined intervals.

A pocket-portable radio signal transmitter 30 receives the preset code containing radio signals from the transmitter stage 18 of the control unit 16. The pocket-portable transmitter 30 is of equivalent size to a bank-card, credit-card and so forth and encloses a long-life battery, such as lithium battery and so forth. The portable transmitter 30 also has a transmitter and receiver antennas 38 and 40 (shown in FIG. 3) built in a transmitter casing.

The portable transmitter 30 compares the code received from the transmitter stage 18 of the control unit 16 with a preset code thereof. Unless the received code matches with the preset code, the portable transmitter 30 will not respond to the received code containing radio signals from the control unit 16. Therefore, the preset code in the transmitter stage 18 of the control unit 16 serves as a "call code", and the preset code in the transmitter 30 to be compared with the call code serves as an "answer code". When the call code matches the answer code, the portable transmitter responds thereto to generate a radio signal containing a preset transmitter identification code through the transmitter antenna.

The receiver stage 20 of the control unit 16 receives the transmitter identification code containing radio signal from the portable transmitter 30. The receiver stage 20 demodulates the received radio signal to feed the transmitter identification code data to the controller stage 22. The transmitter identification code is compared with a preset control code in the controller stage 22. The controller stage 22 outputs the control signal for operating the door lock actuator 14 when the transmitter identification code matches the control code. Simultaneously, the controller stage 22 identifies one of the call codes in the transmitter stage 18, to which the portable transmitter responds to set a priority for the call code responded to so that the responded call code may be transmitted as the first call code contained within the radio signals from the transmitter stage 18 in response to the next occurrence of depression of the push button 24.

Details of the control unit 16 and the portable transmitter 30 will be discussed herebelow with reference to FIGS. 2 and 3.

Figure 2:
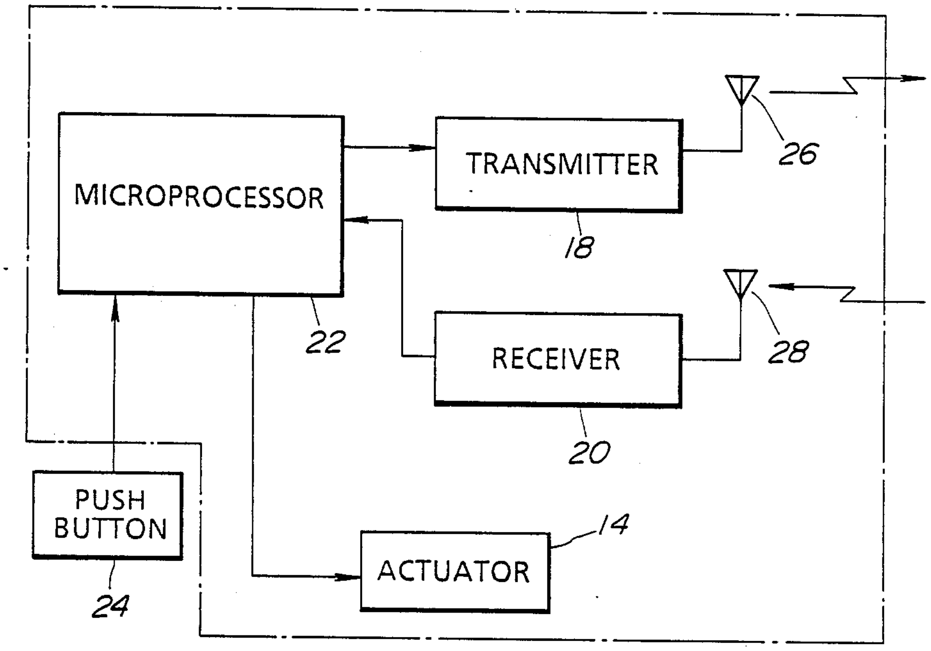
FIG. 2 is a block diagram of a controller in the keyless entry system of FIG. 1.

As shown in FIG. 2, the control unit 16 comprises a microprocessor which constitutes the controller stage 22. The microprocessor 22 is connected to a transmitter circuit forming the transmitter stage 18 of FIG. 1, and a receiver circuit forming the receiver stage 20 in FIG. 1. The transmitter circuit 18 is connected to a transmitter antenna 26 to transmit the call code containing radio signals therethrough. In the preferred construction, the transmitter antenna 26 is located on the outer surface of the vehicle body and at a position close enough to the push button 24 so that the distance of radio signal transmission between the portable transmitter 30 and the control unit 16 can be minimized. Similarly, the receiver circuit 20 is connected to a receiver antenna 28 to receive therefrom the received transmitter identification containing radio signal from the portable transmitter 30. Just like the transmitter antenna 26, the receiver antenna 28 is located on the outer surface of the vehicle body at a position in the vicinity of the push button 24.

The transmitter circuit 18 includes a carrier wave generator and a modulator for superimposing the call code on the carrier wave to form the call code containing radio signals, as set forth above.

Figure 3:
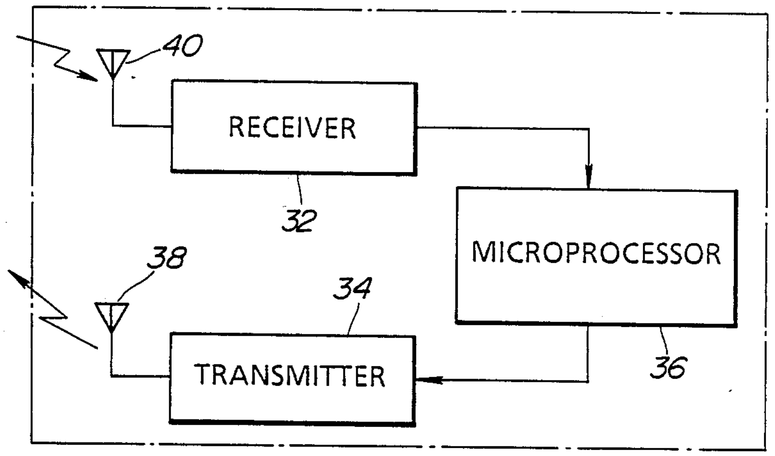
FIG. 3 is a block diagram of a radio signal transmitter in the keyless entry system of FIG. 1.

FIG. 3 shows the portable transmitter circuit which includes a transmitter circuit 34, a receiver circuit 32 and a controller circuit (microprocessor) 36. The transmitter circuit 34 and the receiver circuit 34 are recectively connected to transmitter antenna 38 and a receiver antenna 40. The receiver antenna 40 receives the call-code indicative radio signals and feeds some to the receiver circuit 32. The receiver circuit 32 demodulates the call code indicative radio signals by removing the carrier wave to input the call code to the controller circuit 36. The controller circuit 36 compares the received call code with a preset code to output a self-identifying code which is preset and constituted by several digits of code elements.

The transmitter circuit 34 receives the self-identifying code from the controller circuit 36 to modulate the received code with a carrier wave for generating a self-identifying radio signal. The transmitter circuit 34 transmits the self-identifying radio signal through the transmitter antenna 38.

Figure 4:
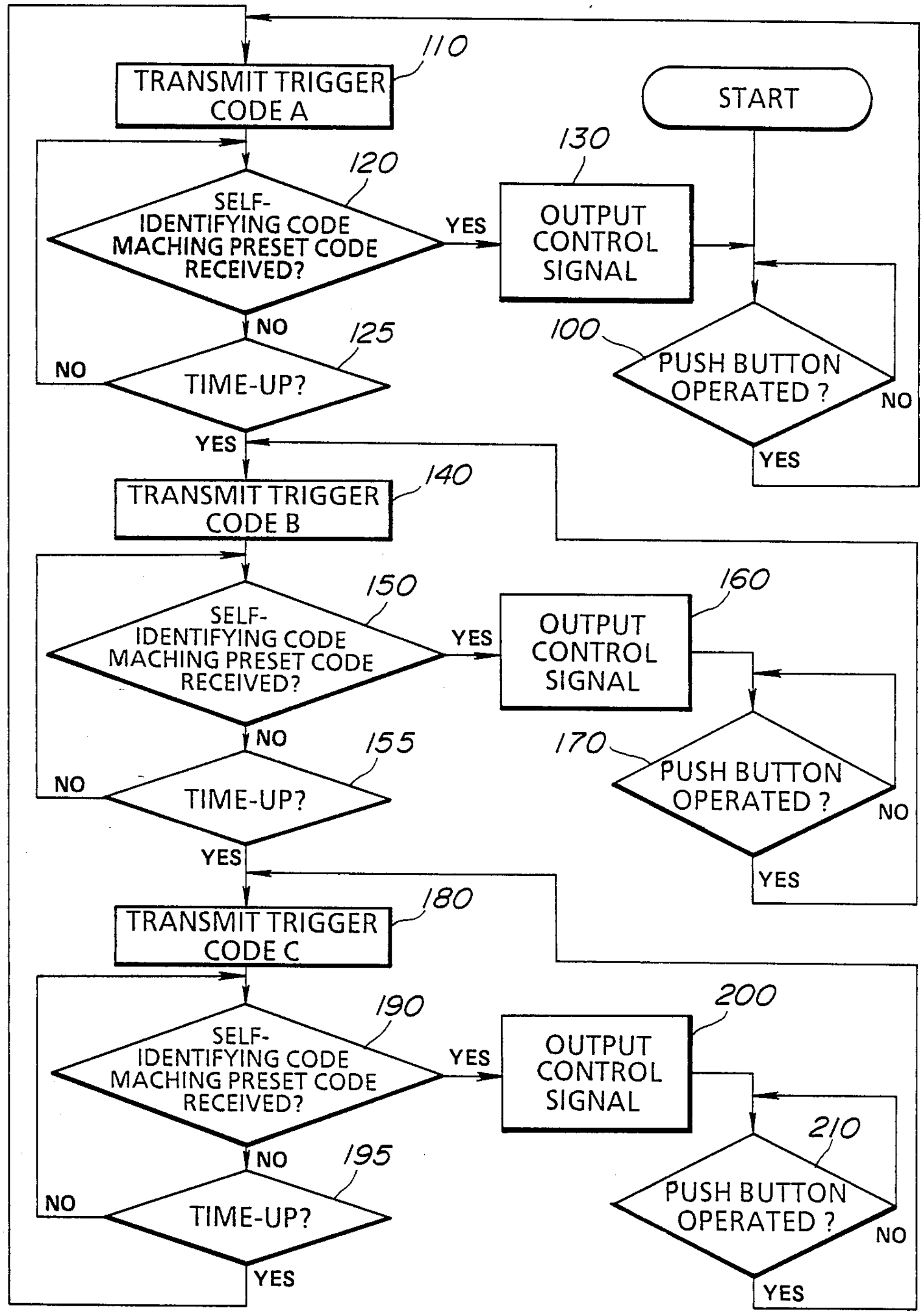
FIG. 4 is a flowchart of a control program to be executed by a microprocessor in the controller of FIG. 2.
Figure 5:
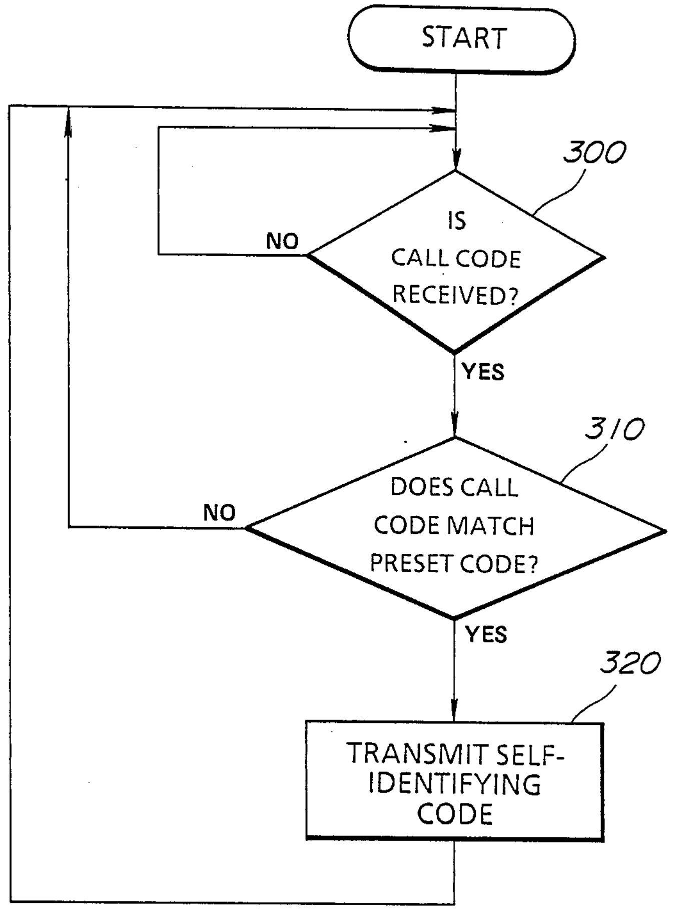
FIG. 5 is a flowchart of a program to be executed by a microprocessor in the radio signal transmitter of FIG. 3.

FIGS. 4 and 5 shows flowcharts of programs to be executed by the control unit 16 and the controller circuit 36.

FIG. 4 is a flowchart of a door lock control program to be executed by the microprocessor 22 of the control unit 16. In the embodiment shown, the microprocessor 22 is set with three mutually distinct codes, e.g. codes A, B and C. The number of call codes to be set in the microprocessor is not limited to three, but can be any number. The microprocessor 22 continues operation to repeatedly execute the door lock control program. At the first step 100, the push button switch 24 is checked to determine it is depressed or not. The step 100 is repeated until the push button switch 24 is depressed. When depression of the bush button switch 24 is detected at the step 100, the process goes to a step 110, in which the microprocessor selects the call code A to transmit the call code containing radio signals indicative of the call code A, to the portable transmitter 30. After transmitting the call code A containing radio signals, the receipt of the self-identified code from the portable transmitter is checked at a step 120. Unless the self-identified code is received or when the received code does not match with a preset code which is set in the microprocessor 22, the process goes to a step 125 to check whether the elapsed time from transmission becomes longer than a given period of time. The steps 120 and 125 are repeated until the given time expires or the self-identifying code matches with the preset code. When matching of the received self-identifying code with the preset code is detected as checked at the step 120, then, process goes to a step 130 to output a door lock control signal to actuate the door lock actuator 14 for reversing the door lock position. That is, if the door lock signal is output while the door lock mechanism 12 is in the door locking position, the door lock actuator 14 becomes active to operate the door lock mechanism 12 to door unlocking position. On the other hand, if the door lock signal is output while the door lock mechanism 12 is in the door unlocking position, the door lock actuator 14 becomes active to operate the door lock mechanism 12 to door locking position. Thereafter, the process returns to the step 110 to wait for the next occurence of depression of the push button. On the other hand, when the "time-up" is detected at the step 125, then the control selects the call code B to transmit the call code B containing radio signal to the portable transmitter 30, at a step 140. After transmitting the call code B containing radio signal at the step 140, the receipt of the self-identified code from the portable transmitter is checked at a step 150. Unless the self-identified code is received or when the received code does not match with a preset code which is set in the microprocessor 22, the process goes to a step 155 to check whether the elapsed time from transmission becomes longer than a given period of time. The steps 150 and 155 are repeated until the given time expires or the self-identifying code matches with the preset code. When matching of the received self-identifying code with the preset code is detected as checked at the step 150, then, process goes to a step 160 to output a door lock control signal to actuate the door lock actuator 14 for reversing the door lock position. That is, if the door lock signal is output while the door lock mechanism 12 is in the door locking position, the door lock actuator 14 becomes active to operate the door lock mechanism 12 to door unlocking position. On the other hand, if the door lock signal is output while the door lock mechanism 12 is in the door unlocking position, the door lock actuator 14 becomes active to operate the door lock mechanism 12 to door locking position. Thereafter, the process goes to the step 170 to wait for the next occurence of depression of the push button.

Similarly, when the "time-up" is detected at the step 155, then the control selects the call code C to transmit the call code C containing radio signal to the portable transmitter 30, at a step 180. After transmitting the call code C containing radio signal at the step 180, the receipt of the self-identified code from the portable transmitter is checked at a step 190. Unless the self-identified code is received or when the received code does not match with a preset code which is set in the microprocessor 22, the process goes to a step 195 to check whether elapsed time from transmission becomes longer than a given period of time. The steps 190 and 195 are repeated until the given time expires or the self-identifying code matches with the preset code. When matching of the received self-identifying code with the preset code is detected as checked at the step 190, then, the process goes to a step 200 to output a door lock control signal to actuate the door lock actuator 14 for reversing the door lock position. That is, if the door lock signal is output while the door lock mechanism 12 is in the door locking position, the door lock actuator 14 becomes active to operate the door lock mechanism 12 to door unlocking position. On the other hand, if the door lock signal is output while the door lock mechanism 12 is in the door unlocking position, the door lock actuator 14 becomes active to operate the door lock mechanism 12 to door locking position. Thereafter, the process goes to the step 210 to wait for the next occurence of depression of the push button.

As will be appreciated herefrom, the microprocessor 22 is responsive to receipt of the self-identifying code matching the preset code so as to place the microprocessor 22 at the stand-by state for transmitting one of the call codes, to which the portable transmitter responded as the first call code. This will shorten the response time upon depression of the push button.

On the other hand, FIG. 5 shows a transmitter controller program to be executed by the control circuit 36 of the portable transmitter 30. Until the call code is received from the control unit 16, a step 300 is repeated to check whether the call code is received or not. When the call code is received, the received call code is compared with the preset code in the controller circuit 36, at a step 310. If the received call code does not match the preset code, the process goes back to the step 300. On the other hand, if the call code matches with the preset code, the self-identifying code is read out and transmitted to the control unit 16 at a step 320.

According to the present invention can fulfills all of the objects and advantages sought therefor.

What is claimed is:

1. A keyless entry system for an automotive vehicle comprising:

a vehicle device including an actuator operating said vehicle device between a predetermined first position and a predetermined second position;

a manually operable switch for triggering keyless entry operation;

first means mounted on a vehicle body and responsive to manual operation of said manually operable switch, for transmitting a first radio signal containing a selected trigger code, said first means being set with a plurality of mutually distinct trigger codes and transmitting one of said trigger codes at a time and in a given order as said selected trigger code;

second means, which is separated from the vehicle body and is portable, for receiving said selected trigger code in said first radio signal to compare with a first preset code, and, upon coincidence of said selected trigger code with said first preset code, generating a second radio signal containing a preset transmitter identifying code; and third means, mounted on a vehicle body and adapted to receive said second radio signal, for comparing said transmitter identifying code with a second preset code for producing a control signal to operate said actuator in said vehicle device to a desired one of said first and second predetermined positions when said transmitter identifying code matches said second preset code, said third means setting one of said triggering codes in said first means to be the first code to be transmitted in response to the next occurrence of manual operation of said manually operable switch.

2. A keyless entry system as set forth in claim 1, wherein said first and third means are combined into a single unit to be mounted on the vehicle.

3. A keyless entry system as set forth in claim 1, wherein said second means comprises a portable transmitter of a size comparable with a credit card or bank card.

4. A keyless entry system as set forth in claim 3, wherein said vehicle device is a door lock operable between said first position which is a door locking position and said second position which is a door unlocking position.

5. A keyless entry system as set forth in claim 4, wherein said third means triggers said first means at a given interval of time to make said first means operative to select a next trigger code in said given order until the transmitter identifying code matching said second preset code is received.

6. A keyless entry system as set forth in claim 5, which further comprises a timer means for measuring an elapsed time from manual operation of said manually operable switch to stop operation of transmission of said selected trigger code when the measured time reaches a given period of time.

7. A radio signal operating keyless entry system for an automotive vehicle comprising:

a vehicle device including an actuator operating said vehicle device between a predetermined first position and a predetermined second position;

a manually operable switch for triggering keyless entry operation;

first means mounted on a vehicle body and responsive to manual operation of said manually operable switch, for transmitting a first radio code signal containing a trigger code, said first means cyclically transmitting said first radio code signal containing one of mutually distinct trigger codes selected in a given order, with a predetermined interval therebetween;

second means, which is separated from the vehicle body and is portable, for receiving said trigger code in said first radio signal to compare said trigger code with a first preset code and, when said trigger code and first preset code coincide, generating a second radio signal containing a preset transmitter identifying code; and third means, mounted on a vehicle body and adapted to receive said second radio signal, for comparing said transmitter identifying code with a second preset code for producing a control signal to operate said actuator in said vehicle device to a desired one of said first and second positions when said transmitter identifying code matches said second preset code, said third means detecting one of said trigger codes, in response to which said transmitter identifying code is received, and setting said detected one of said triggering codes in said first means as the code given first priority to be transmitted in response to the next occurrence of manual operation of said manually operable switch.

8. A radio signal operating keyless entry system for an automotive vehicle comprising:

a vehicle device including an actuator operating said vehicle device between a predetermined first position and a predetermined second position;

a manually operable switch for triggering keyless entry operation;

first means mounted on a vehicle body and responsive to manual operation of said manually operable switch, for cyclically transmitting a first radio code signal containing a trigger code with a given regular interval therebetween which interval is set longer than a possible longest transmission period for radio communication, said first means varying trigger codes which are mutually distinct to each other and selected in a given order, at every occurrence of transmission of said first radio code signal;

second means, which is separated from the vehicle body and is portable, for receiving said trigger code in said first radio signal to compare with a first preset code and, upon coincidence of said trigger code with said first preset code, generating a second radio signal containing a transmitter identifying code; and third means, mounted on a vehicle body and adapted to receive said second radio signal, for comparing said transmitter identifying code with a second preset code for producing a control signal to operate said actuator in said vehicle device to a desired one of said first and second positions when said transmitter identifying code matches said second preset code, said third means detecting one of said trigger codes, in response to which said transmitter identifying code is received, and setting said detected one of said triggering codes in said first means as the code given first priority to be transmitted in response to the next occurrence of manual operation and said manually operable switch.

* * * * *